Jan. 1, 1924

A. L. N. FLEMING 1,479,596

MACHINE FOR MOLDING TYPE AND THE LIKE

Filed Nov. 8, 1921    8 Sheets-Sheet 1

Inventor
August L. N. Fleming
By his Attorney
N. T. Criswell

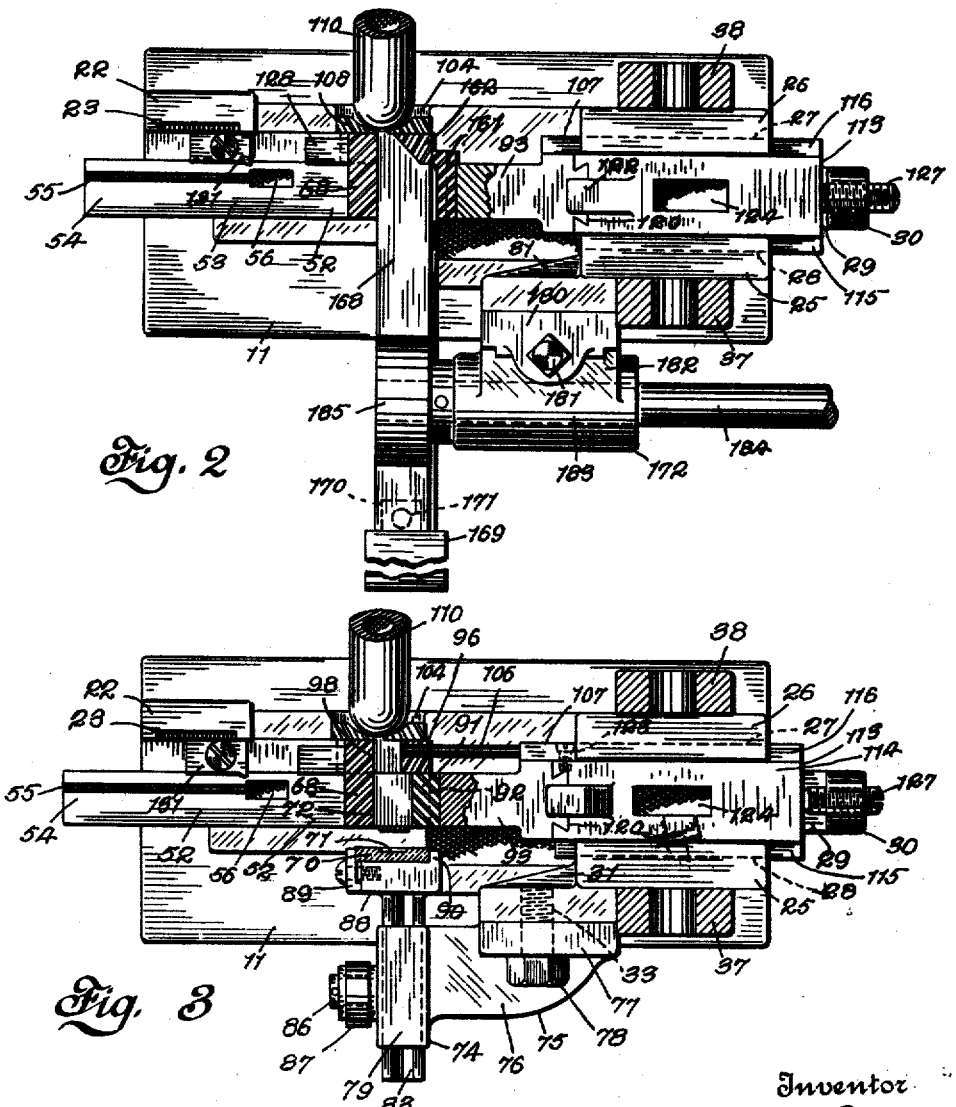

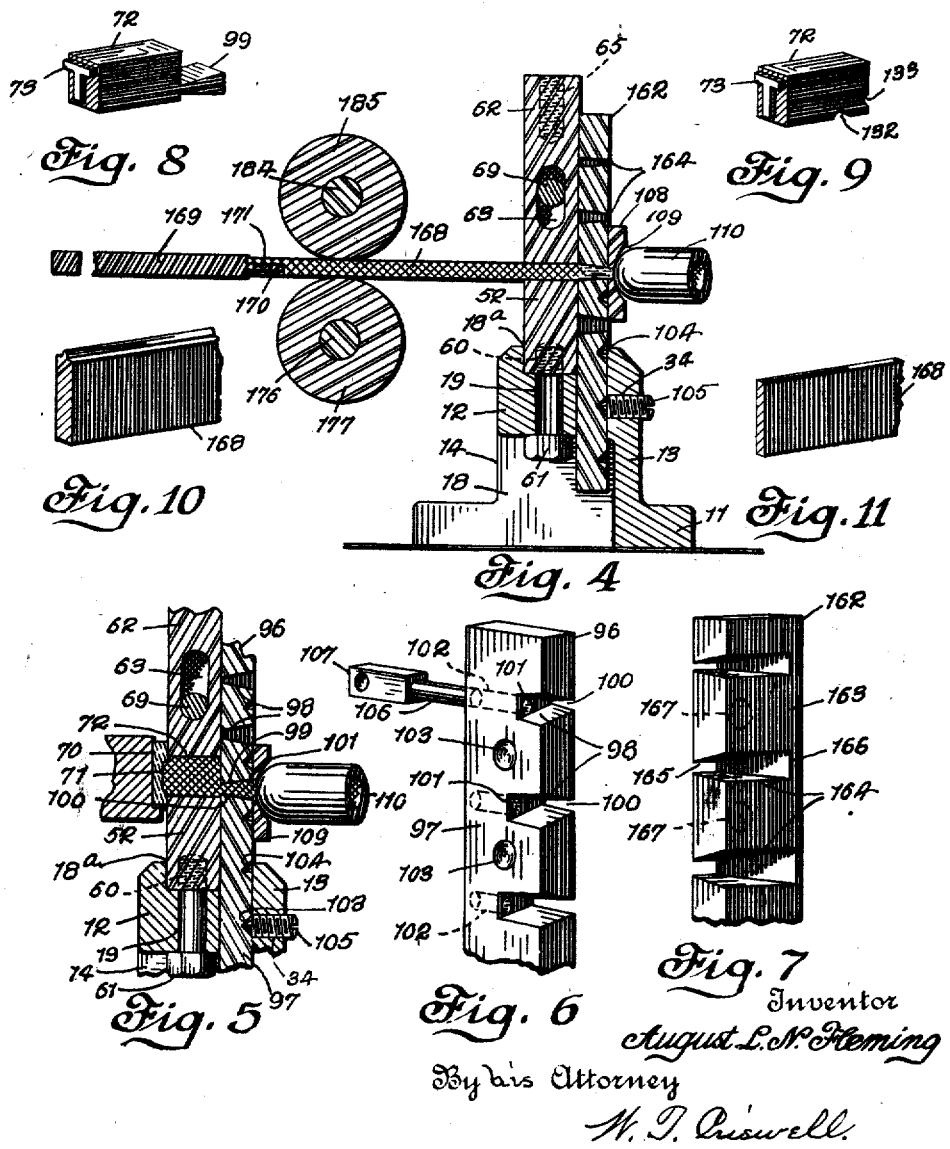

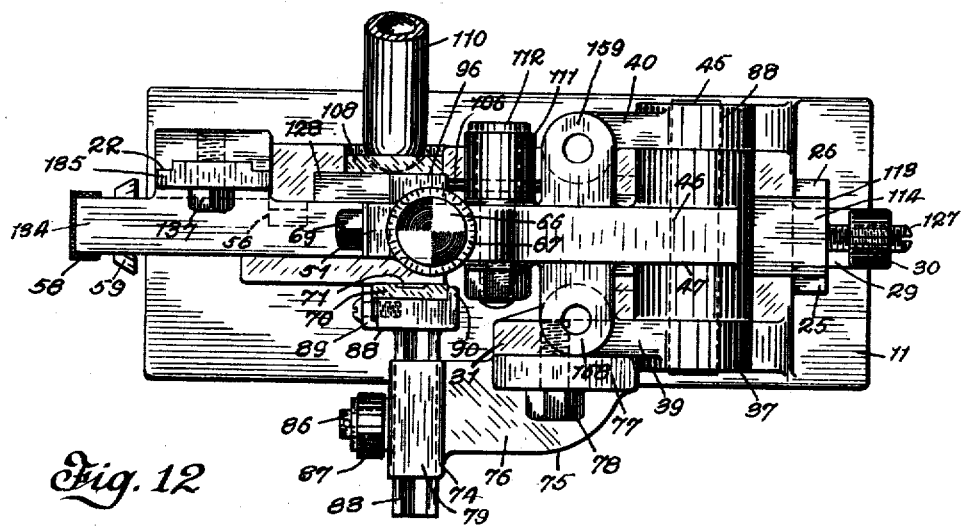

Jan. 1, 1924
A. L. N. FLEMING
1,479,596
MACHINE FOR MOLDING TYPE AND THE LIKE
Filed Nov. 8, 1921         8 Sheets-Sheet 6
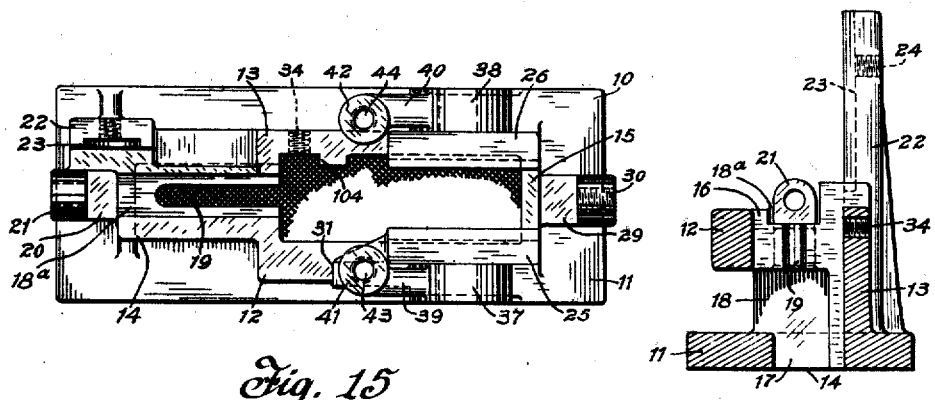
Fig. 15
Fig. 17
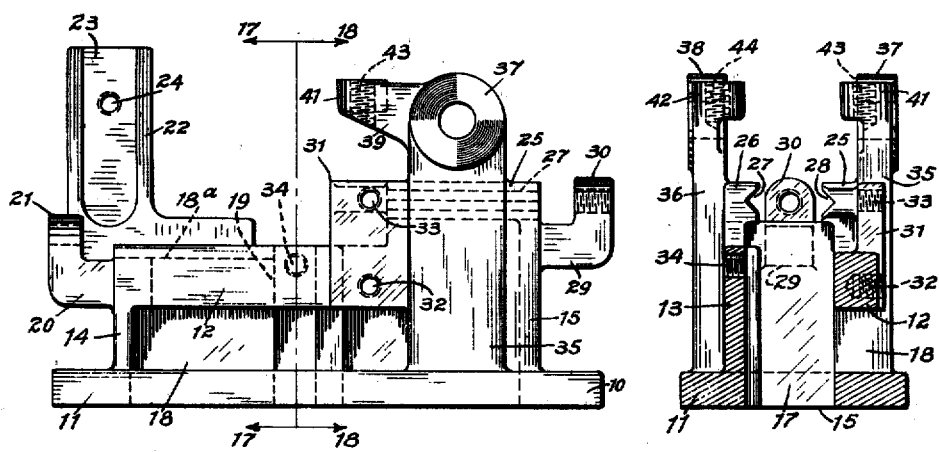
Fig. 16
Fig. 18
Inventor
August L. N. Fleming
By his Attorney
W. T. Criswell

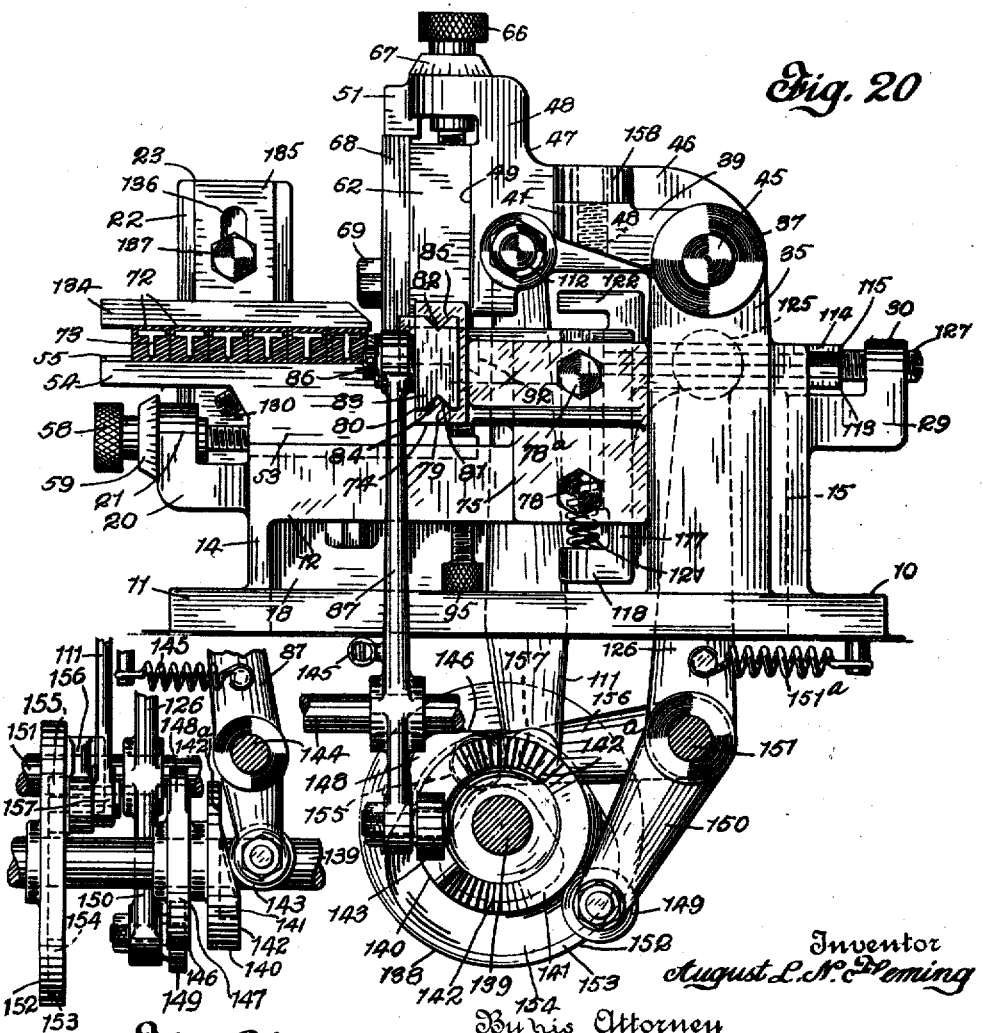

Patented Jan. 1, 1924.

1,479,596

UNITED STATES PATENT OFFICE.

AUGUST L. N. FLEMING, OF LYNDHURST, NEW JERSEY, ASSIGNOR TO AUTOMATIC UNO CORPORATION, OF NEW YORK, N. Y., A CORPORATION OF DELAWARE.

MACHINE FOR MOLDING TYPE AND THE LIKE.

Application filed November 8, 1921. Serial No. 513,643.

*To all whom it may concern:*

Be it known that I, AUGUST L. N. FLEMING, a citizen of the Republic of France, and a resident of Lyndhurst, in the county of Bergen and State of New Jersey, have invented certain new and useful Improvements in a Machine for Molding Type and the like, of which the following is a full, clear, and exact specification.

This invention relates more particularly to a class of apparatus for making printing type and the like.

My invention has for its object primarily to provide a machine designed to be employed for molding printing type, leads, spacers, rules, borders, etc., of various sizes in a manner whereby each casting will be completed during a single continuous operation, and which overcomes the necessity of removing or changing any of the parts of the mold during the casting process so that imperfections, such as flaws in the molded type and the like, will not likely occur. The invention includes essentially a base having a recessed top, and to the base is pivoted one end of a bracket so that its other end may be swung toward and from the recess. In the recess is an adjustable lower jaw and also in the recess may be arranged one or more separate molding matrices. On the movable end of the bracket are carried an upper jaw and a side jaw both adapted to be swung with the bracket to positions for cooperating with the matrices to provide a mold for molding type, rules, borders and the like therebetween. A separate feeder having spaced inlets is adapted to be detachably fastened on the base so that one of its inlets is in register with the mold for receiving from a source of supply molten metal in a manner so that it will be fed in a continuous stream in the mold formed by the jaws and matrices.

Other objects of the invention are to provide an upwardly and downwardly movable lever for raising and lowering the bracket, upper jaw and side jaw in and out of the recess of the base; to provide an ejector for causing the molded type to be discharged following the raising of the upper jaw and side jaw; and to provide a separate discharger adapted to be removably mounted on the base for delivering rules, borders and the like from the machine when molded.

A further object of the invention is to provide a machine for molding type and the like of a simple, efficient and durable construction which may be made in any appropriate shape and size.

With these and other objects in view, the invention will be hereinafter more fully described with reference to the accompanying drawings forming a part of this specification in which similar characters of reference indicate corresponding parts in all the views, and will then be pointed out in the claims at the end of the description.

In the drawings, Figure 1 is a fragmentary detail sectional view taken through one form of machine for molding type and the like embodying my invention.

Fig. 2 is a fragmentary view, showing in detail and partly in section, a top plan of the machine when used for molding rules, borders, etc. and which has parts thereof removed.

Fig. 3 is a fragmentary view, showing in detail and partly in section, a top plan of the machine when used for molding type, and which also has parts thereof removed.

Fig. 4 is a sectional view, partly broken away, taken through parts of the machine when used for casting rules, borders and the like.

Fig. 5 is a fragmentary sectional view taken through parts of the machine on the line 5—5 of Fig. 1 when used for casting type.

Fig. 6 is an enlarged fragmentary view showing a perspective of the feeder employed in the process of molding type.

Fig. 7 is an enlarged fragmentary view showing a perspective of the feeder employed in the process of molding rules, borders and the like.

Fig. 8 is a perspective view of a single type when molded with a tail.

Fig. 9 is a perspective view of the single type when completed.

Fig. 10 is an enlarged fragmentary view showing part of a border when casted.

Fig. 11 is an enlarged fragmentary view showing part of a spacer when casted.

Fig. 12 is a top plan of the machine when provided with the parts for molding type.

Fig. 13 is an inverted plan of the machine when provided with the parts for molding rules, borders and the like.

Fig. 15 is a top plan of the base or bed of the machine.

Fig. 16 is a side elevation of the base.

Fig. 17 is a detailed sectional view taken on the line 17—17 of Fig. 16.

Fig. 18 is a detail sectional view taken on the line 18—18 of Fig. 16.

Fig. 19 is a side elevation, partly fragmentary, of the machine showing its parts when used for molding borders, rules and the like.

Fig. 20 is an enlarged side elevation, partly fragmentary and partly in section, of the machine showing its parts for molding type, and Fig. 21 is a side view, partly framentary and partly in section, showing the parts of the operative mechanism of the machine shown in Fig. 20.

Figure 1:
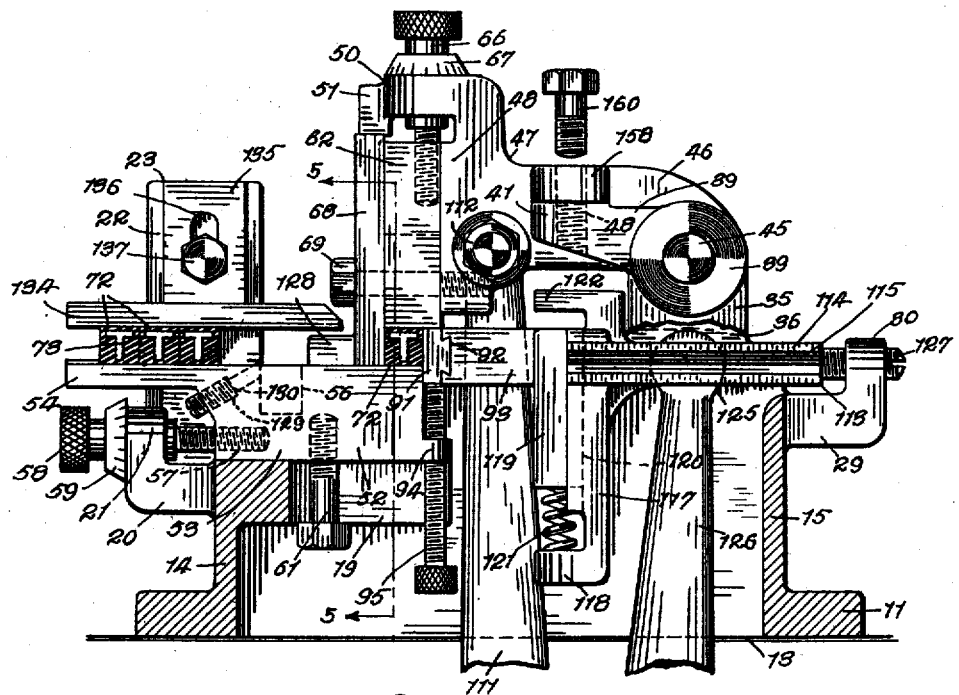

The machine has a base or bed 10 which may be of any suitable size and shape, though the form of the base illustrated is constructed with a substantially rectangular bottom plate 11 with two spaced upstanding side walls 12, 13, and end walls 14, 15. Between the upper parts of these walls is a recess 16, and through the bottom plate 11 may be an opening 17 which leads into the recess 16, while through the lower part of the side wall 12 may be another opening, as 18, which communicates with the opening 17 and with the recess 16. The end wall 14 extends from spaced proximity to one end of the bottom plate 11 to closely spaced proximity to the central part of the bottom plate, and the top face of this end wall is grooved lengthwise, as at 18ª, while in the bottom of this groove is a lengthwise slot, as 19. Extending from the end wall 14 is an arm or lug 20 having an upwardly projecting sleeve or bearing, as 21, the passage through which is disposed toward the groove 18 and toward the slot 19. Projecting upwardly from the side wall 13 at the end wall 14 and in spaced relation to the sleeve 21 is a fixed bracket, as 22, having in its face opposed to the end wall 14 a vertically disposed recess, as 23, and in the upper part of the bottom of the recess is a threaded hole 24. Extending upwardly from the other ends of the side walls 12 and 13 of the base are two flanges, as 25 and 26, in the upper parts of the opposed faces of which are two substantially V-shaped grooves, as 27 and 28, which are in register above the top edge of the end wall 15. Projecting from the end wall 15 of the base is an arm 29 having an upwardly protruding sleeve 30 with its passage being threaded and disposed toward the center of the space between the grooves 27 and 28. On the outer face of the side wall 12 and extending from the end of the grooved flange 25 opposed to the end wall 14 of the base is a fixed plate, as 31, having in its lower part a threaded hole 32 and having in its upper part a second threaded hole 33. In the center of the side wall 13 of the base is still another threaded hole 34. Extending upward from the bottom plate 11 and on the exterior of the side walls 12 and 13 of the base are two stationary standards, as 35 and 36, both of heights so that their upper end parts protrude some distance, and on the upper ends of these standards are bearings 37 and 38. On the bearings 37 and 38 are two arms 39 and 40, respectively, which extend toward the centers of the side walls 12 and 13 of the base, and these arms terminate with sleeves, as 41 and 42, having threaded passages 43 and 44.

In the bearings 37 and 38 of the standards 35 and 36 of the base 10 is journalled the ends of a stud 45 provided on one end of an upwardly curved bar or arm 46 of a bracket 47 adapted to be swung upwardly and downwardly between the bearings toward and from the recess 18 of the base. On the other end of the arm 46 of the bracket is a vertically disposed head or bar 48 of a length so that its ends extend below and above the arm 46, and this head may have a straight face, as 49, opposite to the arm 46 of the bracket. Overhanging the straight face 49 of the head 48 is a sleeve 50 which protrudes from the head, and extending from the part of the edge of the sleeve 50 opposite to the head may be a lug or stop, as 51.

In the groove 18ª of the end wall 14 of the base 10 is an adjustable lower jaw, as 52, and integrally formed on the lower jaw is also an adjustable guide 53. On the upper part of the free end of the guide is a bar, as 54, which extends outwardly from the end of the machine above the arm 20 and sleeve 21. On the top face of the bar 54 may be a lengthwise rib, as 55, and at one end of the rib through the guide at its juncture with the lower jaw 52 is an opening 56 which leads to an opening in the side wall 13 of the base 10. The combined length of the lower jaw 52 and guide 53 is such that one end of the jaw is normally positioned directly under the sleeve 50 of the bracket 47, while the free end of the guide terminates at the outer face of the end wall 14 of the base, and the jaw and guide are preferably of widths corresponding to the standard length of type. The lower jaw and guide are also slidably adjustable toward and from the sleeve 21 of the arm 20 of the base as well as being slidably adjustable toward and from under the head 48 of the swinging bracket 47. Serving as means to adjust the lower jaw and guide, in the end of the guide opposed to the sleeve 21 is a threaded socket 57, and in the passage of the sleeve is a set screw, as 58, having its threaded end screwed in the socket so that by revolving the screw accordingly the jaw and guide will be suitably adjusted back and forth toward and from under the head 48 of the bracket 47. On the screw 58 may be a rotatable collar, as 59, adapted to be screwed into and out of engagement with the sleeve 21 for releasably locking the set screw when properly adjusted against accidental movement, and into a threaded socket 60 in the underside of the lower jaw and guide is screwed a bolt 61 which is movably disposed through the slot 19 of the end wall 14 of the base 10 so that the head of the bolt movably engages the underside of the end wall to prevent all tendency of the lower jaw and guide to shift laterally.

On the bracket 47 and movably arranged against the straight face 49 of the head 48 of the bracket 47 is an upper jaw or plate, as 62, of a width approximately similar to the width of the lower jaw 52, and this upper jaw may be of a length to allow of being adjusted on the bracket upwardly and downwardly in spaced relation to the lower jaw. In the lower part of the upper jaw 62 is a slot or opening 63 disposed lengthwise of the jaw, and this slot is in register with a threaded socket 64 provided in the lower end of the head 48 of the bracket 47. In the upper end of the lower jaw 62 is a threaded socket 65 which is in register with the passage of the sleeve 50 of the bracket 47. Rotatable in the passage of the sleeve 50 and screwed in the socket 65 of the upper jaw 62 is a bolt, as 66, adapted to be rotated for suitably raising and lowering the upper jaw toward and from the lower jaw 52, and on the bolt 66 may be a set collar, as 67, adapted to be revolved into and out of engagement with the sleeve 50 of the bracket 47 to releasably lock the bolt 66 when the upper jaw is adjusted.

Disposed against the face of the upper jaw 62 opposite to the head 48 of the bracket 47, is a side jaw or plate, as 68, of a length so that its upper end abuts against the stop 51 of the bracket 47, while its lower end is adapted to contact with the top of the lower jaw 50 when the bracket is swung downwardly toward the base 10. In a hole in the lower part of the side jaw 68 is a bolt 69 which movably passes through the slot 63 of the upper jaw 62, and the threaded end of the bolt 69 is screwed in the threaded socket 64 of the head 48 of the bracket 47. By tightening or loosening the bolt 69 the upper jaw 62 may be suitably adjusted by the screw 66 in spaced relation to the lower jaw 52 and then releasably locked against movement when in adjusted position. The lower jaw 52, upper jaw 62 and side jaw 68 cooperate to form three side faces of type, rules, borders or the like in the process of molding, as will be hereinafter more fully explained.

In the recess 16 of the base 10, is a removable matrix 70 which is in the form of a plate having in one of its faces a recess, as 71, in the form of a letter, figure or other character for molding on one end of a type, as 72, a letter, as 73, or other desired character. The molding matrix 70 is arranged in the recess of the base so that its recessed face 71 is in opposed relation to the space between the lower jaw 52, and upper jaw 62, and alongside of the side jaw 68 when the bracket is closed on the base, and this molding matrix is detachably fastened to a holder, as 74, which is operable for adjustably moving the matrix toward and from the lower jaw, upper jaw and side jaw.

The holder 74 may be composed of a bracket 75 having an arm, as 76, protruding laterally from a plate, as 77, which is detachably bolted, at 78 and 78ª to the fixed plate 31 of the base 10 by the bolts passing through the holes 32 and 33. On the other end of the arm 76 of the bracket 75 is a sleeve 79 which may be of an elongated substantially rectangular shape having a lengthwise opening 80 in one of its walls. The passage of the sleeve 79 may also be substantially rectangular with two spaced opposed approximately V-shaped ribs 81 and 82 extending lengthwise of the end walls of the passage. In the passage 80 of the sleeve 79 is a slide 83 which is preferably in the form of an elongated substantially rectangular bar having grooves 84 and 85 lengthwise of two of its opposite faces. The slide 83 is movably disposed in the passage of the sleeve 79 so that the ribs 81 and 82 are seated in the grooves 84 and 85, and to a stud 86 protruding from the central part of the slide 83 through the opening 80 of the sleeve 79 is rotatably held the upper end of a lever 87 adapted to be operated with the operation of the machine, as will be hereinafter more fully explained. As shown, the sleeve 79 is arranged so that the slide 83 is movable over the side wall 12 of the base toward and from the lower jaw, upper jaw and side jaw, and on one end of this slide may be a clamp, as 88, having two spaced protruding lugs or fingers, as 89 and 90, between which the type face molding matrix 70 is removably held by a screw being passed through a threaded hole in one of the fingers so as to be rotated into and out of engagement with an edge of the matrix.

Adapted to be removably disposed in the recess 16 of the base of the machine alongside the molding matrix 70 at the inner end of the lower molding jaw 52 is another molding matrix 91 in spaced opposition to the side jaw 68. The matrix 91 may be detachably dovetailed, as at 92, to one end of a block, as 93, and this block with the matrix are movable upwardly and downwardly at the free end of the lower jaw 52 as well as being movable back and forth longitudinally upon and from the upper face of the lower jaw. To limit the downward movements of the matrix 91 and block 93, in an interiorly threaded sleeve 94 extending from the free end of the lower jaw 52 is screwed a threaded bolt 95 adapted to be lowered and raised so that the matrix 91 and block 93 will contact with the upper end of the bolt when lowered a desired distance, in order to permit the matrix 91 to be properly positioned relative to the upper jaw 62 so that when the bracket 47 is lowered upon the base the lower jaw 52, upper jaw 62, side jaw 68, molding matrix 70 and the molding matrix 91 will cooperate to provide a space therebetween in which the type is molded. The entrance to the interior of the mold thus provided will be opposite to the type face molding matrix 70, and to deliver molten metal into the mold, a feeder as 96, is provided.

The feeder 96 has a body 97 preferably in the form of an elongated substantially rectangular plate having in one of its lengthwise edges spaced inlets 98 which may be in the forms of notches each of a tapered or wedge shape to provide on the type when molded a tail, as 99. These inlets or notches are of various sizes so that tails of different sizes may be provided on type of different sizes, and the narrow open end, as 100, into each inlet is at one face of the plate, while the wider end, as 101, of each inlet is at the opposite face of the plate. Through the plate and leading into each inlet from the edge of the plate opposite to the inlets is a hole 102, and in the face of the plate at the wider ends 101 of the inlets as well as between each pair of the inlets is a socket, as 103. When type is to be casted the feeder is disposed downwardly through an opening, as 104, which is provided in the inner end of the end wall adjacent to the side wall 13 of the base so that the body or plate 97 of the feeder will movably abut against the upper jaw 62 of the bracket 47. The feeder is also arranged so that the narrow end 100 of one of the inlets 99 according to the size of type to be casted is in communication with the mold formed by the space between the lower jaw 52, upper jaw 62, side jaw 68, matrix 70 and matrix 91, and so that one of the sockets 103 of the body plate 97 is in register with the threaded hole 34 of the side wall 13 of the base 10. A set screw 105 is then threaded in the hole 34 and in the socket 103 for releasably fastening the feeder to the base against accidental movement. Through the hole 102 of the plate 97 is then inserted a rod 106 which is movable inwardly and outwardly of the inlet toward and from alongside the block 93 of the matrix 91. On the other end of the rod 106 may be held a plate 107 which is disposed at one side of the block 93. To supply molten metal to the inlet of the feeder an apertured plate, as 108, may be arranged against the plate 97 of the feeder so that the aperture of the plate 107 leads into the wide end 101 of the inlet, and in the outer face of the plate 108 may be a concavity 109 in which is seated the feed nipple, as 110, of an appropriate shape for delivering to the mold molten type metal.

Figure 14:
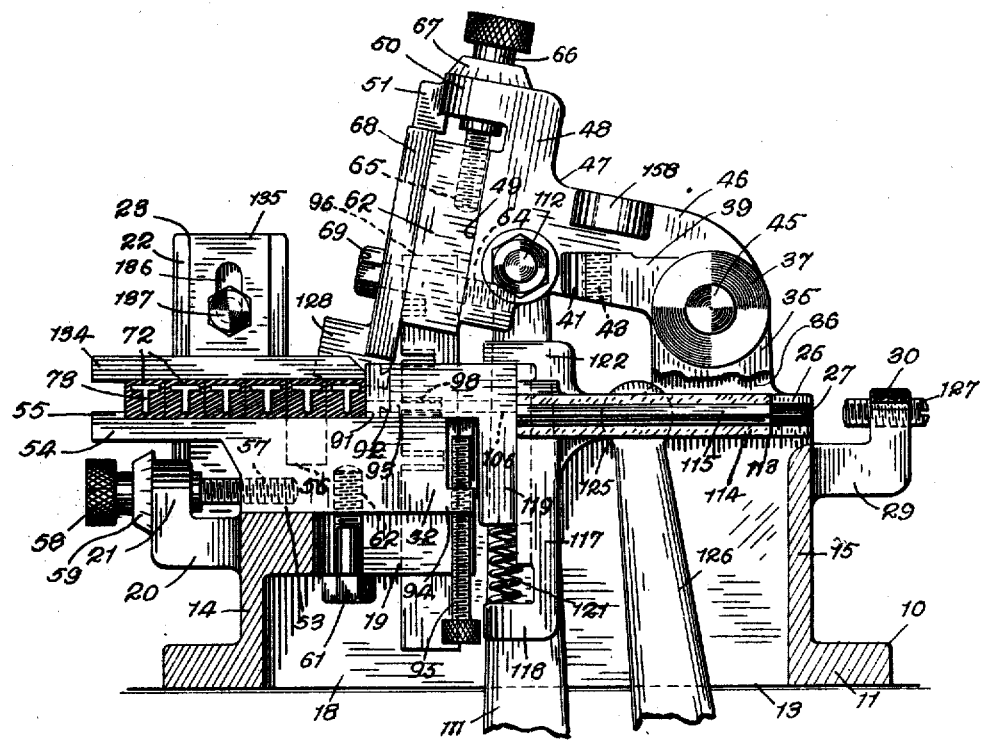
Fig. 14 is a view, partly fragmentary, showing a detailed section taken through the lower part of the machine and which shows a side elevation of the swinging bracket of the machine.
Figure 19:
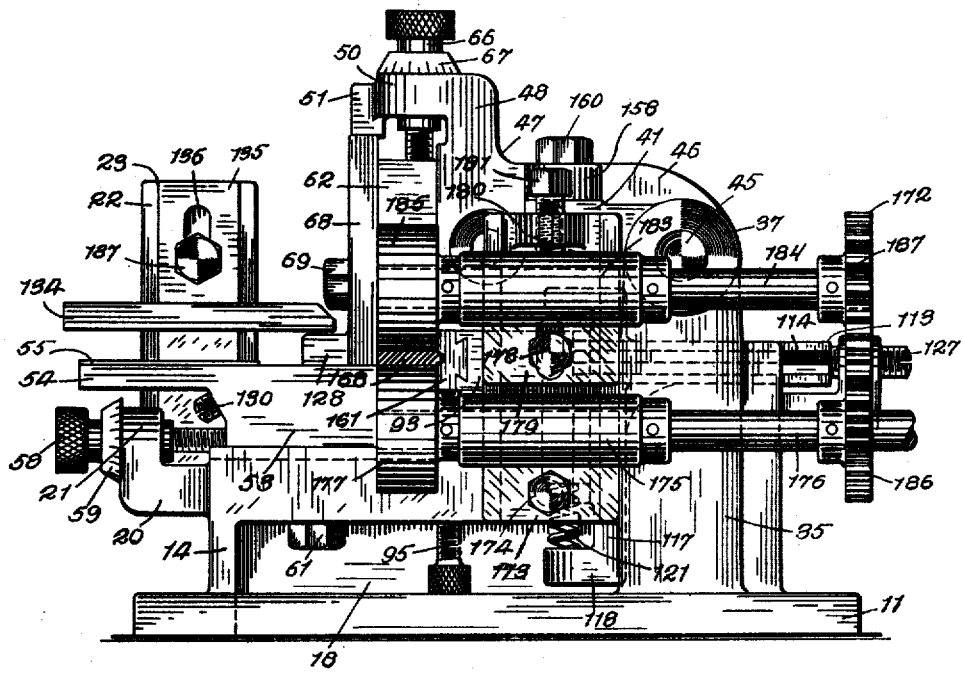

To mold the type by the machine the bracket 47 is swung downwardly upon the base 10, as shown in Figs. 1, 12, 20, to a position so that the jaws 52, 62, 68 and matrices 70, 91 will cooperate for providing the mold, as above explained. Molten metal is delivered from the nipple 110 to and through the inlet 98 of the feeder 96 into the mold between the jaws and matrices. Following the casting of each type the bracket 47 is swung upwardly above the base by a lever or bar, as 111, having its upper end pivoted, at 112, to the bracket at the lower part of its head 48. With the raising of the bracket the jaws 62 and 68 will be elevated above the base, as shown in Fig. 14, and an ejector, as 113, is then operated to discharge each single type on top of the guide 53 and on its arm 54.

The ejector 113 is preferably of a form having a bar, as 114, which is slidably movable between the flanges 25 and 26 toward and from the sleeve 30 of the arm 29 of the base, and projecting from the sides of the bar 114 are two ribs 115 and 116 of substantially V-shapes which are slidably arranged in the V-shaped grooves 27 and 28 of the flanges 25 and 26. Extending downwardly from the inner end of the slide or bar 114 is an arm, as 117, which terminates with a foot or lug, as 118, protruding under the block 93. Projecting downwardly from the underside of the end of the block 93 opposite to the matrix 91 is an arm, as 119, of a length so that its lower end is spaced from the foot 118 of the arm 117 of the slide 114. The block 93 and its arm 119 are dovetailed, at 120, to the slide 114 and to its arm 117 for allowing the block 93 and matrix 91 to be forced upwardly and downwardly from and upon the top of the lower jaw 52. Between the lug 118 of the arm 117 of the slide 114 and the lower end of the arm 117 of the block 93 is a spring, as 121, which normally serves to force the block 93, its arm 117 and the matrix 91 in upward directions. When the bracket 47 is swung upon the base with the upper jaw 62 and side jaw 68 in positions to and from the mold, as shown in Fig. 1, during the casting of type the matrix 91 and block 93 are disposed upon the adjusting screw 95 in positions sligthly below the upper face of the lower jaw 52, and the spring 121 is compressed against its tension. With the raising of the bracket 47, jaw 62 and jaw 68 by the lever 111 the tension of the spring 121 will raise the matrix 91 and block 93 to the upper face of the lower jaw 52 and guide 53, and to prevent the matrix 91 and block 93 from moving beyond the top of the lower jaw, a stop or arm, as 122, is provided on the slide or bar 114 so that it overhangs as well as being spaced above the block 93. The plate 107 of the rod 106 is removably screwed, at 123, to the slide 114, and in an opening 124 in the center of the slide is movably disposed the head, as 125, provided on the upper end of a lever or bar, as 126. The lever 126 is movable back and forth toward and from the lower jaw 52. Following the raising of the bracket 47, jaw 62, jaw 68 and following the raising of the matrix 91 and block 93 by the action of the spring 121 the slide 114 will be moved by the operation of the lever 126 in a direction toward the lower jaw 52. In turn the block 93 and matrix 91 will be moved upon the top face of the lower jaw toward the guide 53, and the plate 107 with the rod 106 will likewise be moved. The casted type with its tail will then be discharged upon the guide 52, after which the lever 126 will be reversely moved to reposition the block 93, matrix 91, and rod 106. Subsequent to this operation of these parts the lever 111 will be operated to lower the bracket 47, upper jaw 62 and side jaw 68 upon the base to cooperate with the matrix 70 and matrix 91 for accomplishing the casting of other type.

In order to limit the movement of the slide 114, block 93 and matrix 91 in a direction from the lower jaw 52, in the threaded sleeve 30 of the arm 29 of the base 10 is a set screw 127 which is so adjusted that the slide 114 will contact therewith when the block 93 and matrix 91 are reversely moved after the discharge of the type to the free end of the lower jaw 52 for being lowered upon the stop or screw 95 preceding the operation of the lever 111 for lowering the bracket 47 and jaws 62 and 68, as above explained. After the operation of the lever 111 to raise the bracket and jaws 62, 68, the lever 87 is operated to cause the slidable bar 83, clamp 88 and holding matrix 70 to move in the sleeve 79 in a direction from the jaws 52, 62, 68 to allow the molded type to be ejected, and this lever 87 is reversely operated to reposition the matrix 70, clamp 88 and the slidable bar 83 with the reverse operation of the lever 126 to reposition the matrix 91 and block 93.

On the lower end of the side jaw is a hammer, as 128, which may be in the form of a cutting plate or block extending in a lateral as well as in a downward direction from the side jaw for being moved upwardly and downwardly to and from the edge of the guide 53 at the side wall 13 of the base with the raising and lowering of the side jaw by the swinging of the bracket 47. With the ejection of each single type after being casted the hammer 128 will be raised by the raising of the side jaw 68 and bracket 47, and with the lowering of the bracket and side jaw the hammer will contact with and break from each molded type its tail 99.

In the guide 53 is a threaded opening 129 which leads into the opening 56 at the top face of the guide, and in the threaded opening 129 is a threaded cutter or chisel blade, as 130, adapted to be adjusted so that its cutting end will protrude above the guide 53. Also on top of the guide in spaced relation to the hammer 128 is another cutter, as 131. Following the breaking of the tail 99 of each type and with its movement on the guide by the ejection of subsequent molded type a groove 132 will be cut across the lower side face of each type by the cutter 130, and the cutter 131 will cut a second groove 133 across the tail of the type. Each successive molded type will with its ejection cause the preceding molded type to be delivered on the guide 53 and on its arm 54. Above the guide 53 and arm 54 may be a bar, as 134, having on one of its side edges a plate 135 which is slidably arranged in the recess 23 of the bracket 22 for being moved to permit the bar 134 to be adjusted to various heights above the guide 53 and above the arm 54. In the plate 135 is a slot 136, and in this slot as well as in the threaded hole 124 in the bracket 22 is a set screw 137 adapted to be loosened and tightened when the plate 135 and bar 134 are suitably positioned above the guide 53 and arm 54 to accommodate the casted type therebetween.

Serving to operate the levers 87, 111, 126 for operating the machine, as explained, when casting type, a mechanism, as 138, is provided. The mechanism 138 may be of any suitable type, though the form of the mechanism illustrated has a drive shaft 139 adapted to be driven by any appropriate power. On this drive shaft is held a cam 140 which may be in the form of a circular disk 141 having on one of its faces an outwardly curved extension or hump, as 142, and having a concavity, as 142ª, opposite to the hump. Movably contacting with the cam is a roller 143 provided on the lever 87 of the holder 74. On the lever 87 above its lower end is a bearing, revolubly mounted on a shaft or rod, as 144, which may be suitably supported so that the lever 87 will rock back and forth toward and from the machine when the shaft 139 and cam 140 are driven so that the roller 143 will be swung at intervals from the disk 141 by the hump 142 to likewise swing the lever. The lever 87 is reversely swung yieldingly by a spring, as 145, having one of its ends attached to the lever above the shaft 144, while its other end is held to the base 10 of the machine. On the drive shaft 139 is held another cam 146 which is also in the form of a circular disk 147 having on part of its peripheral edge an extension or curved hump, as 148. In contact with the peripheral edge of the cam 146 is a roller 149 provided on the end of a downwardly inclined arm 150 of the lever 126, and at the intersection of this inclined arm with the upper part of the lever is a bearing rotatably mounted on a shaft or rod 151 which may be supported in a manner to allow the lever 126 to be rocked back and forth for operating the ejector 113, as explained, when the shaft 139 and cam 146 are driven. The roller 149 is retained in revolvable contact with the cam 146 by a spring 151ª having one of its ends held to the lever 126 while its other end is held to the base 10 for normally serving to force the lever and its arm 150 toward the cam 146. On the drive shaft 139 is still another cam, as 152, in the form of a circular disk 153 having in one of its faces a curved groove 154 of somewhat a triangular shape. In the cam 154 is revolubly disposed a roller 155 provided on one end of an arm 156 having its other end rotatably mounted on the shaft 151, and to the arm 156 intermediate its end is pivoted, at 157, the lower end of the lever 111 so that when the shaft 39 and cam 152 are driven the movement of the roller 155 in the triangular groove 154 will cause the arm 156 to rock at intervals for moving the lever 111 upwardly and downwardly to raise and lower the bracket 47, upper jaw 62 and side jaw 68, as above explained. The cam 140, its hump 142 and its cavity 142ª, the cam 146 with its hump 148, and the cam 152 with its triangular groove 154 are so proportioned as well as being arranged relative to the drive shaft 139 that when the drive shaft is driven the lever 111 will be alternately moved upwardly and downwardly to raise and lower the bracket 47 and jaws 62, 68. The lever 87 will then be rocked back and forth to operate the holder 74 for moving the molding matrix 70 to and from the lower molding jaw 52, and the lever 126 will subsequently be swung to operate the ejector 113 back and forth to cause the molding matrix 91 to be shifted back and forth upon and from the lower jaw 52 during the casting of type by the machine.

When the machine is employed for casting printing rules, borders, spacers and the like, the bracket 47 is releasably locked to the base 10 by providing on the arm 46 of the bracket two threaded sleeves, as 158 and 159, which extend from the bracket in opposite lateral directions so that their passages are adapted to be registered with the passages 43 and 44 of the sleeves 41 and 42 provided on the arms 39 and 40 of the base 10 when the bracket is in lowered position. In the registered passages of each pair of the sleeves is threaded a set screw 160 to prevent the bracket from being raised. The holder 74 with its bracket 75, clamp 86 and molding matrix 70 are removed from the machine. The operation of the mechanism 138, lever 111 and lever 126 are stopped. The side molding matrix 91, rod 106, plate 107 and feeder 96 are also removed from the machine. Instead of the matrix 91 a form of molding matrix, as 161, may be removably dovetailed to the block 93 of the ejector 113, and instead of the feeder 96 a form of feeder 162, Figs. 2, 4, 7, is removably arranged in the opening 104 of the base 10. The lower jaw 52, upper jaw 62, side jaw 68, matrix 161 and the feeder 162 then provides the mold for casting rules, borders, spacers and the like. The feeder 162 has a body 163 preferably in the form of a substantially rectangular plate, and in one of the lengthwise edges of the plate are spaced inlets, as 164, in the forms of notches of different widths. The inlets or notches 164 are tapered or wedge shaped to provide a narrow entrance 165 and a wide outlet, as 166. In the face of the plate 163 having the entrances 165 to the inlets are recesses, as 167, one between each pair of the inlets. When a printing rule or border, as 168, Figs. 2 and 4, is cast the feeder 162 is inserted in the opening 104 of the base so that the outlet end 166 of one of the inlets 164 is in register with the space between the lower molding jaw 52 and the upper molding jaw 62, following the adjustment of the upper jaw to proper spaced relation with the lower jaw. The feeder is then removably fastened to the wall 14 of the base by the screw 105 engaging one of the recesses 167 of the feeder. The concaved plate 109 and nipple 110 are then arranged for feeding molten metal through the entrance 165, and through the inlet 164 of the feeder 162 to the mold formed by the space between the lower jaw and upper jaw. The rule or border when casted may be received by a plate or block, as 169, having on one of its ends a tongue, as 170. This tongue having a hole 171 therein is molded into the end of the rule or border when the molten metal is fed between the lower jaw and upper jaw. In order to deliver the casted rule or border from the machine, a separate discharger, as 172, is provided.

The form of the discharger 172 illustrated has a bracket 173 which is removably fastened, at 174, by a screw to the lower part of the plate 31 of the side wall 12 of the base 10, and on this bracket is a sleeve bearing, as 175, disposed on the base toward the lower jaw 52. In the bearing 175 is journaled a shaft 176 having on one of its ends a roller 177 of a size so that its periphery is on a plane corresponding to the top of the lower jaw 32. The shaft 176 is of a length so that its second end extends beyond the stop screw 127 of the ejector 113 of the machine for being driven by any suitable power. To the plate 31 of the side wall 12 of the base 10 and above the bearing 175 of the shaft 176 is fastened by a screw 178 a slotted bracket, as 179, adapted to be adjusted upwardly and downwardly, and on the upper end of this bracket may be an overhanging flange, as 180. In the flange is a threaded hole having a screw 181 threaded therethrough, and this screw 181 is also threaded in an arm, as 182, carrying a sleeve bearing 183 which is spaced above the bearing 175 of the carrier so that by adjusting the screw 181 the bearing 183 may be also adjusted in spaced relation to the bearing 175. The bearings 183 and 175 may be of similar lengths as well as being disposed in like directions, and in the bearing 183 is journaled a shaft 184 having on one of its ends a roller 185 which is spaced directly above the roller 177. The second end of the shaft 184 extends outwardly toward and above the end of the shaft 176 opposite to the roller 177, and on these ends of both of the shafts are provided meshing gears 186 and 187 so that with the driving of the shaft 176 the gears 186, 187, shafts 172, 184, and the rollers 177, 185 will be driven in unison for delivering the printing rule or border 168 by the rotatable frictional engagement of the rollers with the upper and lower faces of the casted rule or border, the roller 185 being properly adjusted in spaced relation to the roller 177 by the adjustment of the bearing 183 to permit delivery therebetween of the casted rule or border to be accomplished. Thus I provide an efficient and durable machine wherein is employed molding jaws adapted to be adjusted for use in conjunction with matrices for casting printing type, rules, borders and the like without requiring the utilization of expensive interchangeable molds as ordinarily used.

In the foregoing description, I have embodied the preferred form of my invention, but I do not wish to be understood as limiting myself thereto, as I am aware that modifications may be made therein without departing from the principle or sacrificing any of the advantages of this invention, therefore, I reserve to myself the right to make such changes as fairly fall within the scope thereof.

Having thus described my invention, I claim as new and desire to secure by Letters Patent:—

1. In a machine for molding type and the like, in combination, a base having a recessed top, a lower jaw in the recess, molding matrices removably arranged in the recess, an upper jaw, a side jaw, said upper jaw and side jaw being adapted to be raised and lowered toward and from the lower jaw to positions for cooperating with the lower jaw and with the matrices to provide a mold therebetween, and a feeder having spaced inlets detachably fastened on the base so that one of its inlets is in register with the mold for receiving molten metal to be fed into the mold formed by the jaws and matrices.

2. In a machine for molding type and the like, in combination, a base having a recessed top, a lower jaw in the recess, molding matrices removably arranged in the recess, an upper jaw, a side jaw, said upper jaw and side jaw being adapted to be raised and lowered toward and from the lower jaw to positions for cooperating with the lower jaw and with the matrices to provide a mold therebetween, a feeder having spaced inlets detachably fastened on the base so that one of its inlets is in register with the mold for receiving molten metal to be fed into the mold formed by the jaws and matrices, and an ejector operable at intervals for causing the molded type to be successively discharged following the raising of the upper jaw and side jaw.

3. In a machine for molding type and the like, in combination, a base having a recessed top, a lower jaw slidably adjustable in the recess, molding matrices removably arranged in the recess, an adjustable upper jaw, a side jaw, said upper jaw and side jaw being adapted to be raised and lowered toward and from the lower jaw to positions for cooperating with the lower jaw and with the matrices to provide a mold therebetween, a feeder having spaced inlets detachably fastened on the base so that one of its inlets is in register with the mold for receiving molten metal to be fed into the mold formed by the jaws and matrices, and an ejector operable at intervals for causing the molded type to be successively discharged following the raising of the upper jaw and side jaw.

4. In a machine for molding type and the like, in combination, a base having a recessed top, an adjustable lower jaw in the recess, molding matrices removably arranged in the recess, an adjustable upper jaw, a side jaw, said upper jaw and side jaw being adapted to be raised and lowered toward and from the lower jaw to positions for cooperating with the lower jaw and with the matrices to provide a mold therebetween for admitting molten metal to be fed into the mold formed by the jaws and matrices, an ejector operable at intervals for causing the molded type to be successively discharged following the raising of the upper jaw and side jaw, a cutter on the lower jaw for grooving one of the side faces of each type with its ejection following being molded, and a second cutter on the base for grooving the tail end of each type.

5. In a machine for molding type and the like, in combination, a base having a recessed top, an adjustable lower jaw in the recess, molding matrices removably arranged in the recess, an adjustable upper jaw, a side jaw, said upper jaw and side jaw being adapted to be raised and lowered toward and from the lower jaw to positions for cooperating with the lower jaw and with the matrices to provide a mold therebetween, a feeder having spaced inlets detachably fastened on the base so that one of its inlets is in register with the mold for receiving molten metal to be fed into the mold formed by the jaws and matrices, an ejector operable at intervals for causing the molded type to be successively discharged following the raising of the upper jaw and side jaw, a cutter on the lower jaw for grooving one of the side faces of each type with its ejection following being molded, and a second cutter on the base for grooving the tail end of each type.

6. In a machine for molding type and the like, in combination, a base having a recessed top, a bracket pivoted to the base so that one of its ends may be swung toward and from the recess, a lower jaw in the recess, an upper jaw on the movable end of the bracket, a side jaw fixed to the bracket alongside the upper jaw so as to be swung into and out of contact with the lower jaw, a separate type face molding matrix adapted to be removably arranged on the base, a side molding matrix adapted to be removably arranged in the recess of the base in spaced relation to the side jaw, and a separate feeder having spaced inlets of different sizes, adapted to be detachably fastened to the base so that one of its inlets will be in communication with the space between all of the jaws and said matrices for receiving molten metal for being molded into type.

7. In a machine for molding type and the like, in combination, a base having a recessed top, a bracket pivoted to the base so that one of its ends may be swung toward and from the recess, a lower jaw adjustable in the recess, means operable for adjusting the lower jaw and guide toward and from under the bracket, an adjustable upper jaw on the movable end of the bracket, a side jaw fixed to the bracket alongside the upper jaw so as to be swung into and out of contact with the lower jaw, a separate type face molding matrix adapted to be removably arranged on the base, a side molding matrix adapted to be removably arranged in the recess of the base in spaced relation to the side jaw, and a separate feeder having spaced inlets of different sizes, adapted to be detachably fastened to the base so that one of its inlets will be in communication with the space between all of the jaws and said matrices for receiving molten metal for being molded into type.

8. In a machine for molding type and the like, in combination, a base having a recessed top, a bracket pivoted to the base so that one of its ends may be swung toward and from the recess, a lower jaw adjustable in the recess, means operable for adjusting the lower jaw toward and from under the bracket, an adjustable upper jaw on the movable end of the bracket, means operable for adjusting the upper jaw toward and from the lower jaw, a side jaw fixed to the bracket alongside the upper jaw so as to be swung into and out of contact with the lower jaw, a separate type face molding matrix adapted to be removably arranged on the base, a side molding matrix adapted to be removably arranged in the recess of the base in spaced relation to the side jaw, and a side molding matrix adapted to be removably arranged in the recess of the base in spaced relation to the side jaw, and a feeder having spaced inlets of different sizes, adapted to be detachably fastened to the base so that one of its inlets will be in communication with the space between all of the jaws and said matrices for receiving molten metal for being molded into type.

9. In a machine for molding type and the like, in combination, a base having a recessed top, a bracket pivoted to the base so that one of its ends may be swung toward and from the recess, a lower jaw in the recess, a guide protruding from the jaw, an upper jaw on the movable end of the bracket, a side jaw on the bracket alongside the upper jaw so as to be swung into and out of contact with the lower jaw, a separate type face molding matrix adapted to be removably arranged on the base, a side molding matrix adapted to be removably arranged in the recess of the base in spaced relation to the side jaw, and a separate feeder having spaced inlets of different sizes, adapted to be detachably fastened to the base so that one of its inlets will be in communication with the space between all of the jaws and said matrices for receiving molten metal for being molded into type.

10. In a machine for molding type and the like, in combination, a base having a recessed top, a bracket pivoted to the base so that one of its ends may be swung toward and from the recess, a lower jaw adjustable in the recess, a guide protruding from the jaw, means operable for adjusting both the jaw and guide in unison toward and from under the bracket, an adjustable upper jaw on the movable end of the bracket, a side jaw fixed to the bracket alongside the upper jaw so as to be swung into and out of contact with the lower jaw, a separate type face molding matrix adapted to be removably arranged on the base, a side molding matrix adapted to be removably arranged in the recess of the base in spaced relation to the side jaw, and a separate feeder having spaced inlets of different sizes, adapted to be detachably fastened to the base so that one of its inlets will be in communication with the space between all of the jaws and said matrices for receiving molten metal for being molded into type.

11. In a machine for molding type and the like, in combination, a base having a recessed top, a bracket pivoted to the base so that one of its ends may be swung toward and from the recess, a lower jaw adjustable in the recess, a guide protruding from the jaw, means operable for adjusting both the jaw and guide in unison toward and from under the bracket, an adjustable upper jaw on the movable end of the bracket, means operable for adjusting the upper jaw toward and from the lower jaw, a side jaw fixed to the bracket alongside the upper jaw so as to be swung into and out of contact with the lower jaw, a separate type face molding matrix adapted to be removably arranged on the base, a side molding matrix adapted to be removably arranged in the recess of the base in spaced relation to the side jaw, and a separate feeder having spaced inlets of different sizes, adapted to be detachably fastened to the base so that one of its inlets will be in communication with the space between all of the jaws and said matrices for receiving molten metal for being molded into type.

12. In a machine for molding type and the like, in combination, a base having a recessed top, a bracket pivoted to the base so that one of its ends may be swung toward and from the recess, a lower jaw in the recess, an upper jaw on the movable end of the bracket, a side jaw fixed to the bracket alongside the upper jaw so as to be swung into and out of contact with the lower jaw, a separate type face molding matrix adapted to be removably arranged on the base, a separate holder adapted to be removably mounted for being operated to move the molding matrix toward and from the lower jaw, upper jaw and side jaw, a side molding matrix adapted to be removably arranged in the recess of the base in spaced relation to the side jaw, and a separate feeder having spaced inlets of different sizes, adapted to be detachably fastened to the base so that one of its inlets will be in communication with the space between all of the jaws and said matrices for receiving molten metal for being molded into type.

13. In a machine for molding type and the like, in combination, a base having a recessed top, a bracket pivoted to the base so that one of its ends may be swung toward and from the recess, a lower jaw in the recess, an adjustable upper jaw on the movable end of the bracket, means operable for adjusting the upper jaw toward and from the lower jaw, a side jaw fixed to the bracket alongside the upper jaw so as to be swung into and out of contact with the lower jaw, a separate type face molding matrix adapted to be removably arranged on the base, a separate holder adapted to be removably mounted for being operated to move the molding matrix toward and from the lower jaw, upper jaw and side jaw, a side molding matrix adapted to be removably arranged in the recess of the base in spaced relation to the side jaw, and a separate feeder having spaced inlets of different sizes, adapted to be detachably fastened to the base so that one of its inlets will be in communication with the space between all of the jaws and said matrices for receiving molten metal for being molded into type.

14. In a machine for molding type and the like, in combination, a base having a recessed top, a bracket pivoted to the base so that one of its ends may be swung toward and from the recess, a lower jaw adjustable in the recess, a guide protruding from the jaw, an adjustable upper jaw on the movable end of the bracket, a side jaw fixed to the bracket alongside the upper jaw so as to be swung into and out of contact with the lower jaw, a separate type face molding matrix adapted to be removably arranged on the base, a separate holder adapted to be removably mounted for being operated to move the molding matrix toward the lower jaw, upper jaw and side jaw, a side molding matrix adapted to be removably arranged in the recess of the base in spaced relation to the side jaw, and a separate feeder having spaced inlets of different sizes, adapted to be detachably fastened to the base so that one of its inlets will be in communication with the space between all of the jaws and said matrices for receiving molten metal for being molded into type.

15. In a machine for molding type and the like, in combination, a base having a recessed top, a bracket pivoted to the base so that one of its ends may be swung toward and from the recess, a lower jaw adjustable in the recess, a guide protruding from the jaw, means operable for adjusting both the jaw and guide in unison toward and from under the bracket, an adjustable upper jaw on the movable end of the bracket, a side jaw fixed to the bracket alongside the upper jaw so as to be swung into and out of contact with the lower jaw, a separate type face molding matrix adapted to be removably arranged on the base, a separate holder adapted to be removably mounted for being operated to move the molding matrix toward the lower jaw, upper jaw and side jaw, a side molding matrix adapted to be removably arranged in the recess of the base in spaced relation to the side jaw, and a separate feeder having spaced inlets of different sizes, adapted to be detachably fastened to the base so that one of its inlets will be in communication with the space between all of the jaws and said matrices for receiving molten metal for being molded into type.

16. In a machine for molding type and the like, in combination, a base having a recessed top, a bracket pivoted to the base so that one of its ends may be swung toward and from the recess, a lower jaw adjustable in the recess, a guide protruding from the jaw, means operable for adjusting both the jaw and guide in unison toward and from under the bracket, an adjustable upper jaw on the movable end of the bracket, means operable for adjusting the upper jaw toward and from the lower jaw, a side jaw fixed to the bracket alongside the upper jaw so as to be swung into and out of contact with the lower jaw, a separate type face molding matrix adapted to be removably arranged on the base, a separate holder adapted to be removably mounted for being operated to move the molding matrix toward the lower jaw, upper jaw and side jaw, a side molding matrix adapted to be removably arranged in the recess of the base in spaced relation to the side jaw, and a separate feeder having spaced inlets of different sizes, adapted to be detachably fastened to the base so that one of its inlets will be in communication with the space between all of the jaws and said matrices for receiving molten metal for being molded into type.

17. In a machine for molding type and the like, in combination, a base having a recessed top, a bracket pivoted to the base so that one of its ends may be swung toward and from the recess, a lower jaw adjustable in the recess, an upper jaw on the movable end of the bracket, a side jaw fixed to the bracket alongside the upper jaw so as to be swung into and out of contact with the lower jaw, a separate type face molding matrix adapted to be removably arranged on the base, a separate holder adapted to be removably mounted for being operated to move the molding matrix toward the lower jaw, upper jaw and side jaw, a side molding matrix adapted to be removably arranged in the recess of the base in spaced relation to the side jaw, means on the lower jaw, operable for adjusting said side matrix toward the upper jaw, and a separate feeder having spaced inlets of different sizes, adapted to be detachably fastened to the base so that one of its inlets will be in communication with the space between all of the jaws and said matrices for receiving molten metal for being molded into type.

18. In a machine for molding type and the like, in combination, a base having a recessed top, a bracket pivoted to the base so that one of its ends may be swung toward and from the recess, a lower jaw adjustable in the recess, an adjustable upper jaw on the movable end of the bracket, means operable for adjusting the upper jaw toward and from the lower jaw, a side jaw fixed to the bracket alongside the upper jaw so as to be swung into and out of contact with the lower jaw, a separate type face molding matrix adapted to be removably arranged on the base, a side molding matrix adapted to be removably arranged in the recess of the base in spaced relation to the side jaw, means on the lower jaw, operable for adjusting said side matrix toward the upper jaw, and a separate feeder having spaced inlets of different sizes, adapted to be detachably fastened to the base so that one of its inlets will be in communication with the space between all of the jaws and said matrices for receiving molten metal for being molded into type.

19. In a machine for molding type and the like, in combination, a base having a recessed top, a bracket pivoted to the base so that one of its ends may be swung toward and from the recess, a lower jaw adjustable in the recess, means operable for adjusting the jaw toward and from under the bracket, an adjustable upper jaw on the movable end of the bracket, a side jaw fixed to the bracket alongside the upper jaw so as to be swung into and out of contact with the lower jaw, a separate type face molding matrix adapted to be removably arranged on the base, a side molding matrix adapted to be removably arranged in the recess of the base in spaced relation to the side jaw, means on the lower jaw, operable for adjusting said side matrix toward the upper jaw, and a separate feeder having spaced inlets of different sizes, adapted to be detachably fastened to the base so that one of its inlets will be in communication with the space between all of the jaws and said matrices for receiving molten metal for being molded into type.

20. In a machine for molding type and the like, in combination, a base having a recessed top, a bracket pivoted to the base so that one of its ends may be swung toward and from the recess, a lower jaw adjustable in the recess, means operable for adjusting the jaw toward and from under the bracket, an adjustable upper jaw on the movable end of the bracket, means operable for adjusting the upper jaw toward and from the lower jaw, a side jaw fixed to the bracket alongside the upper jaw so as to be swung into and out of contact with the lower jaw, a separate type face molding matrix adapted to be removably arranged on the base, a separate holder adapted to be removably mounted for being operated to move the molding matrix toward the lower jaw, upper jaw and side jaw, a side molding matrix adapted to be removably arranged in the recess of the base in spaced relation to the side jaw, means on the lower jaw, operable for adjusting said side matrix toward the upper jaw, and a separate feeder having spaced inlets of different sizes, adapted to be detachably fastened to the base so that one of its inlets will be in communication with the space between all of the jaws and said matrices for receiving molten metal for being molded into type.

21. In a machine for molding type and the like, in combination, a base having a recessed top, a bracket pivoted to the base so that one of its ends may be swung toward and from the recess, a lower jaw adjustable in the recess, a guide protruding from the jaw, means operable for adjusting both the jaw and guide in unison toward and from under the bracket, an adjustable upper jaw on the movable end of the bracket, a side jaw fixed to the bracket alongside the upper jaw so as to be swung into and out of contact with the lower jaw, a separate type face molding matrix adapted to be removably arranged on the base, a side molding matrix adapted to be removably arranged in the recess of the base in spaced relation to the side jaw, means on the lower jaw, operable for adjusting said side matrix toward the upper jaw, and a separate feeder having spaced inlets of different sizes, adapted to be detachably fastened to the base so that one of its inlets will be in communication with the space between all of the jaws and said matrices for receiving molten metal for being molded into type.

22. In a machine for molding type and the like, in combination, a base having a recessed top, a bracket pivoted to the base so that one of its ends may be swung toward and from the recess, a lower jaw adjustable in the recess, a guide protruding from the jaw, means operable for adjusting both the jaw and guide in unison toward and from under the bracket, an adjustable upper jaw on the movable end of the bracket, means operable for adjusting the upper jaw toward and from the lower jaw, a side jaw fixed to the bracket alongside the upper jaw so as to be swung into and out of contact with the lower jaw, a separate type face molding matrix adapted to be removably arranged on the base, a separate holder adapted to be removably mounted for being operated to move the molding matrix toward the lower jaw, upper jaw and side jaw, a side molding matrix adapted to be removably arranged in the recess of the base in spaced relation to the side jaw, means on the lower jaw, operable for adjusting said side matrix toward the upper jaw, and a separate feeder having spaced inlets of different sizes, adapted to be detachably fastened to the base so that one of its inlets will be in communication with the space between all of the jaws and said matrices for receiving molten metal for being molded into type.

23. In a machine for molding type and the like, in combination, a base having a recessed top, a bracket pivoted to the base so that one of its ends may be swung toward and from the recess, a lower jaw adjustable in the recess, an upper jaw on the movable end of the bracket, a side jaw fixed to the bracket alongside the upper jaw so as to be swung into and out of contact with the lower jaw, a separate type face molding matrix adapted to be removably arranged on the base, a side molding matrix adapted to be removably arranged in the recess of the base in spaced relation to the side jaw, a separate feeder having spaced inlets of different sizes, adapted to be detachably fastened to the base so that one of its inlets will be in communication with the space between all of the jaws and said matrices for receiving molten metal for being molded into type, and an ejector carrying the side matrix slidably movable for causing molded type to be discharged.

24. In a machine for molding type and the like, in combination, a base having a recessed top, a bracket pivoted to the base so that one of its ends may be swung toward and from the recess, a lower jaw adjustable in the recess, means operable for adjusting the jaw toward and from under the bracket, an adjustable upper jaw on the movable end of the bracket, a side jaw fixed to the bracket alongside the upper jaw so as to be swung into and out of contact with the lower jaw, a separate type face molding matrix adapted to be removably arranged on the base, upper jaw and side jaw, a side molding matrix adapted to be removably arranged in the recess of the base in spaced relation to the side jaw, a separate feeder having spaced inlets of different sizes, adapted to be detachably fastened to the base so that one of its inlets will be in communication with the space between all of the jaws and said matrices for receiving molten metal for being molded into type, and an ejector carrying the side matrix slidably movable for causing molded type to be discharged.

25. In a machine for molding type and the like, in combination, a base having a recessed top, a bracket pivoted to the base so that one of its ends may be swung toward and from the recess, a lower jaw adjustable in the recess, means operable for adjusting the jaw toward and from under the bracket, an adjustable upper jaw on the movable end of the bracket, means operable for adjusting the upper jaw toward and from the lower jaw, a side jaw fixed to the bracket alongside the upper jaw so as to be swung into and out of contact with the lower jaw, a separate type face molding matrix adapted to be removably arranged on the base, a side molding matrix adapted to be removably arranged in the recess of the base in spaced relation to the side jaw, a separate feeder having spaced inlets of different sizes, adapted to be detachably fastened to the base so that one of its inlets will be in communication with the space between all of the jaws and said matrices for receiving molten metal for being molded into type, and an ejector carrying the said side matrix slidably movable for causing molded type to be discharged.

26. In a machine for molding type and the like, in combination, a base having a recessed top, a bracket pivoted to the base so that one of its ends may be swung toward and from the recess, a lower jaw adjustable in the recess, a guide protruding from the jaw, means operable for adjusting both the jaw and guide in unison toward and from under the bracket, an adjustable upper jaw on the movable end of the bracket, a side jaw fixed to the bracket alongside the upper jaw so as to be swung into and out of contact with the lower jaw, a separate type face molding matrix adapted to be removably arranged on the base, a side molding matrix adapted to be removably arranged in the recess of the base in spaced relation to the side jaw, a separate feeder having spaced inlets of different sizes, adapted to be detachably fastened to the base so that one of its inlets will be in communication with the space between all of the jaws and said matrices for receiving molten metal for being molded into type and the like as well as forming a tail thereon, an ejector carrying the side matrix, slidably movable for causing molded type to be delivered on the guide of the lower jaw, and a hammer on the side jaw for breaking off the tail of type with the lowering of the bracket and following the ejected movement of the type.

27. In a machine for molding type and the like, in combination, a base having a recessed top, a bracket pivoted to the base so that one of its ends may be swung toward and from the recess, a lower jaw adjustable in the recess, a guide protruding from the jaw, means operable for adjusting both the jaw and guide in unison toward and from under the bracket, an adjustable upper jaw on the movable end of the bracket, a side jaw fixed to the bracket alongside the upper jaw so as to be swung into and out of contact with the lower jaw, a separate type face molding matrix adapted to be removably arranged on the base, a side molding matrix adapted to be removably arranged in the recess of the base in spaced relation to the side jaw, a separate feeder having spaced inlets of different sizes, adapted to be detachably fastened to the base so that one of its inlets will be in communication with the space between all of the jaws and said matrices for receiving molten metal for being molded into type and the like as well as forming a tail thereon, an upwardly and downwardly movable lever for raising and lowering the bracket, upper jaw and side jaw in and out of the recess of the base, an ejector carrying the side matrix, slidably movable for causing molded type to be delivered on the guide of the lower jaw, and a hammer on the side jaw for breaking off the tail of type with the lowering of the bracket and following the ejected movement of the type.

28. In a machine for molding type and the like, in combination, a base having a recessed top, a bracket pivoted to the base, so that one of its ends may be swung toward and from the recess, a lower jaw adjustable in the recess, a guide protruding from the jaw, means operable for adjusting both the jaw and guide in unison toward and from under the bracket, an adjustable upper jaw on the movable end of the bracket, a side jaw fixed to the bracket alongside the upper jaw so as to be swung into and out of contact with the lower jaw, a separate type face molding matrix adapted to be removably arranged on the base, a side molding matrix adapted to be removably arranged in the recess of the base in spaced relation to the side jaw, a separate feeder having spaced inlets of different sizes, adapted to be detachably fastened to the base so that one of its inlets will be in communication with the space between all of the jaws and said matrices for receiving molten metal for being molded into type and the like as well as forming a tail thereon, an upwardly and downwardly movable lever for raising and lowering the bracket, upper jaw and side jaw in and out of the recess of the base, an ejector carrying the side matrix, slidably movable for causing molded type to be delivered on the guide of the lower jaw, a lever operable for moving the ejector at intervals following the upward swinging of the bracket, upper jaw and side jaw, and a hammer on the side jaw for breaking off the tail of type with the lowering of the bracket and following the ejected movement of the type.

29. In a machine for molding type and the like, in combination, a base having a recessed top, a bracket pivoted to the base so that one of its ends may be swung toward and from the recess, a lower jaw adjustable in the recess, a guide protruding from the jaw, means operable for adjusting both the jaw and guide in unison toward and from under the bracket, an adjustable upper jaw on the movable end of the bracket, a side jaw fixed to the bracket alongside the upper jaw so as to be swung into and out of contact with the lower jaw, a separate type face molding matrix adapted to be removably arranged on the base, a side molding matrix adapted to be removably arranged in the recess of the base in spaced relation to the side jaw, a separate feeder having spaced inlets of different sizes, adapted to be detachably fastened to the base so that one of its inlets will be in communication with the space between all of the jaws and said matrices for receiving molten metal for being molded into type and the like as well as forming a tail thereon, an ejector carrying the side matrix, slidably movable for causing molded type to be delivered on the guide of the lower jaw, a hammer on the side jaw for breaking off the tail of type with the lowering of the bracket and following the ejected movement of the type, and a cutter on the guide for grooving one of the side faces of each type with its ejection following being molded, a second cutter on the base for grooving the tail end of each type subsequent to the severance of its tail, a device adapted to be removably mounted on the base for being operated to discharge rules, borders and the like when molded, and means for releasably locking the bracket to the base.

30. In a machine for molding type and the like, in combination, a base having a recessed top, a bracket pivoted to the base so that one of its ends may be swung toward and from the recess, a lower jaw adjustable in the recess, a guide protruding from the jaw, means operable for adjusting both the jaw and guide in unison toward and from under the bracket, an adjustable upper jaw on the movable end of the bracket, a side jaw fixed to the bracket alongside the upper jaw so as to be swung into and out of contact with the lower jaw, a separate type face molding matrix adapted to be removably arranged on the base, a side molding matrix adapted to be removably arranged in the recess of the base in spaced relation to the side jaw, a separate feeder having spaced inlets of different sizes, adapted to be detachably fastened to the base so that one of its inlets will be in communication with the space between all of the jaws and said matrices for receiving molten metal for being molded into type and the like as well as forming a tail thereon, an ejector carrying the side matrix, slidably movable for causing molded type to be delivered on the guide of the lower jaw, a hammer on the side jaw for breaking off the tail of type with the lowering of the bracket and following the ejected movement of the type, a cutter on the guide for grooving one of the side faces of each type with its ejection following being molded, and a second cutter on the base for grooving the tail end of each type subsequent to the severance of its tail.

31. In a machine for molding type and the like in combination, a base having a recessed top, a bracket pivoted to the base so that one of its ends may be swung toward and from the recess, a lower jaw adjustable in the recess, a guide protruding from the jaw, means operable for adjusting both the jaw and guide in unison toward and from under the bracket, an adjustable upper jaw on the movable end of the bracket, a side jaw fixed to the bracket alongside the upper jaw so as to be swung into and out of contact with the lower jaw, a separate type face molding matrix adapted to be removably arranged on the base, a side molding matrix adapted to be removably arranged in the recess of the base in spaced relation to the side jaw, a separate feeder having spaced inlets of different sizes, adapted to be detachably fastened to the base so that one of its inlets will be in communication with the space between all of the jaws and said matrices for receiving molten metal for being molded into type and the like as well as forming a tail thereon, an upwardly and downwardly movable lever for raising and lowering the bracket, upper jaw and side jaw in and out of the recess of the base, an ejector carrying the side matrix, slidably movable for causing molded type to be delivered on the guide of the lower jaw, a hammer on the side jaw for breaking off the tail of type with the lowering of the bracket and following the ejected movement of the type, a cutter on the guide for grooving one of the side faces of each type with its ejection following being molded, and a second cutter on the base for grooving the tail end of each type subsequent to the severance of its tail.

32. In a machine for molding type and the like, in combination, a base having a recessed top, a bracket pivoted to the base so that one of its ends may be swung toward and from the recess, a lower jaw adjustable in the recess, a guide protruding from the jaw, means operable for adjusting both the jaw and guide in unison toward and from under the bracket, an adjustable upper jaw on the movable end of the bracket, a side jaw fixed to the bracket alongside the upper jaw so as to be swung into and out of contact with the lower jaw, a separate type face molding matrix adapted to be removably arranged on the base, a side molding matrix adapted to be removably arranged in the recess of the base in spaced relation to the side jaw, a separate feeder having spaced inlets of different sizes, adapted to be detachably fastened to the base so that one of its inlets will be in communication with the space between all of the jaws and said matrices for receiving molten metal for being molded into type and the like as well as forming a tail thereon, an upwardly and downwardly movable lever for raising and lowering the bracket, upper jaw and side jaw in and out of the recess of the base, an ejector carrying the side matrix, slidably movable for causing molded type to be delivered on the guide of the lower jaw, a lever operable for moving the ejector at intervals following the upward swinging of the bracket, upper jaw and side jaw, a hammer on the side jaw for breaking off the tail of type with the lowering of the bracket and following the ejected movement of the type, a cutter on the guide for grooving one of the side faces of each type with its ejection following being molded, and a second cutter on the base for grooving the tail end of each type subsequent to the severance of its tail.

33. In a machine for molding type and the like, in combination, a base, a lower jaw adjustable on the base, an adjustable upwardly and downwardly movable upper jaw, a side jaw fixed alongside the upper jaw so as to be swung into and out of contact with the lower jaw, a separate type face molding matrix adapted to be removably arranged on the base, a side molding matrix adapted to be removably arranged on the base in spaced relation to the side jaw, a separate feeder having spaced inlets of different sizes, adapted to be detachably fastened to the base so that one of its inlets will be in communication with the space between all of the jaws and said matrices for receiving molten metal for being molded into type, an ejector carrying the side matrix, slidably movable for causing molded type to be delivered on the lower jaw, and mechanism adapted to be operated for raising and lowering the upper and lower jaws, then moving the type face matrix and subsequently operating said ejector.

34. In a machine for molding type and the like, in combination, a base, a lower jaw adjustable on the base, an adjustable upwardly and downwardly movable upper jaw, a side jaw fixed alongside the upper jaw so as to be swung into and out of contact with the lower jaw, a separate type face molding matrix adapted to be removably arranged on the base, a separate holder adapted to be removably applied to the base for being operated to adjustably move said matrix toward and from the lower jaw, a side molding matrix adapted to be removably arranged in the recess of the base in spaced relation to the side jaw, a separate feeder having spaced inlets of different sizes, adapted to be detachably fastened to the base so that one of its inlets will be in communication with the space between all of the jaws and said matrices for receiving molten metal for being molded into type, an ejector carrying the side matrix, slidably movable for causing molded type to be delivered on the guide of the lower jaw, and mechanism adapted to be operated for raising and lowering the upper jaw and side jaw, then operating the holder and subsequently operating said ejector.

35. In a machine for molding type and the like, in combination, a base, a lower jaw adjustable on the base, an adjustable upwardly and downwardly movable upper jaw, a side jaw fixed to the bracket alongside the upper jaw so as to be swung into and out of contact with the lower jaw, a separate type face molding matrix adapted to be removably arranged on the base, a separate holder adapted to be removably applied to the base for being operated to adjustably move said matrix toward and from the lower jaw, a side molding matrix adapted to be removably arranged in the recess of the base in spaced relation to the side jaw, a separate feeder having spaced inlets of different sizes, adapted to be detachably fastened to the base so that one of its inlets will be in communication with the space between all of the jaws and said matrices for receiving molten metal for being molded into type and the like as well as forming a tail thereon, an ejector carrying the side matrix, slidably movable for molded type to be delivered on the guide of the lower jaw, a hammer on the side jaw for breaking off the tail of type with the lowering of the upper and lower jaws and following the ejected movement of the type, and mechanism adapted to be operated for raising and lowering the bracket, then operating the holder and subsequently operating said ejector.

36. In a machine for molding type and the like, in combination, a base, a bracket pivoted to the base, a lower jaw adjustable on the base, means operable for adjusting the jaw toward and from under the bracket, an adjustable upper jaw on the movable end of the bracket, a side jaw fixed to the bracket alongside the upper jaw so as to be swung into and out of contact with the lower jaw, a separate type face molding matrix adapted to be removably arranged on the base, a separate holder adapted to be removably applied to the base for being operated to adjustably move said matrix toward and from the lower jaw, a side molding matrix adapted to be removably arranged in the recess of the base in spaced relation to the side jaw, a separate feeder having spaced inlets of different sizes, adapted to be detachably fastened to the base so that one of its inlets will be in communication with the space between all of the jaws and said matrices for receiving molten metal for being molded into type, an ejector carrying the side matrix, slidably movable for molded type to be delivered on the guide of the lower jaw, and mechanism adapted to be operated for raising and lowering the bracket, then operating the holder and subsequently operating said ejector.

37. In a machine for molding type and the like, in combination, a base, a bracket pivoted to the base, a lower jaw adjustable on the base, an adjustable upper jaw on the movable end of the bracket, a side jaw fixed to the bracket alongside the upper jaw so as to be swung into and out of contact with the lower jaw, a separate type face molding matrix adapted to be removably arranged on the base, a separate holder adapted to be removably applied to the base for being operated to adjustably move said matrix toward and from the lower jaw, a side molding matrix adapted to be removably arranged in the recess of the base in spaced relation to the side jaw, a separate feeder having spaced inlets of different sizes, adapted to be detachably fastened to the base so that one of its inlets will be in communication with the space between all of the jaws and said matrices for receiving molten metal for being molded into type and the like as well as forming a tail thereon, an ejector carrying the side matrix, slidably movable for molded type to be delivered on the guide of the lower jaw, a hammer on the side jaw for breaking off the tail with the lowering of the bracket and following the ejected movement of the type, and mechanism adapted to be operated for raising and lowering the bracket, then operating the holder and subsequently operating said ejector.

38. In a machine for molding type and the like, in combination, a base, a bracket pivoted to the base, a lower jaw adjustable on the base, an adjustable upper jaw on the movable end of the bracket, a side jaw fixed to the bracket alongside the upper jaw so as to be swung into and out of contact with the lower jaw, a separate type face molding matrix adapted to be removably arranged on the base, a separate holder adapted to be removably applied to the base for being operated to adjustably move said matrix toward and from the lower jaw, a side molding matrix adapted to be removably arranged in the recess of the base in spaced relation to the side jaw, a separate feeder having spaced inlets of different sizes, adapted to be detachably fastened to the base so that one of its inlets will be in communication with the space between all of the jaws and said matrices for receiving molten metal for being molded into type and the like as well as forming a tail thereon, an ejector carrying the side matrix, slidably movable for molded type to be delivered on the guide of the lower jaw, a hammer on the side jaw for breaking off the tail of type with the lowering of the bracket and following the ejected movement of the type, a cutter on the guide for grooving one of the side faces of each type with its ejection following being molded, and mechanism adapted to be operated for raising and lowering the bracket, then operating the holder and subsequently operating said ejector.

39. In a machine for molding type and the like, in combination, a base, a bracket pivoted to the base, a lower jaw adjustable on the base, an adjustable upper jaw on the movable end of the bracket, a side jaw fixed to the bracket alongside the upper jaw so as to be swung into and out of contact with the lower jaw, a separate type face molding matrix adapted to be removably arranged on the base, a separate holder adapted to be removably applied to the base for being operated to adjustably move said matrix toward and from the lower jaw, a side molding matrix adapted to be removably arranged in the recess of the base in spaced relation to the side jaw, a separate feeder having spaced inlets of different sizes, adapted to be detachably fastened to the base so that one of its inlets will be in communication with the space between all of the jaws and said matrices for receiving molten metal for being molded into type and the like as well as forming a tail thereon, an ejector carrying the side matrix, slidably movable for causing molded type to be delivered on the guide of the lower jaw, a hammer on the side jaw for breaking off the tail of type with the lowering of the bracket and following the ejected movement of the type, a cutter on the guide for grooving one of the side faces of each type with the its ejection following being molded, a second cutter on the base for grooving the tail end of each type subsequent to the severance of its tail, and mechanism adapted to be operated for raising and lowering the bracket, then operating the holder and subsequently operating said ejector.

40. In a machine for molding type and the like, in combination, a base, a bracket pivoted to the base, a lower jaw adjustable on the base, means operable for adjusting the jaw toward and from under the bracket, an adjustable upper jaw on the movable end of the bracket, a side jaw fixed to the bracket alongside the upper jaw so as to be swung into and out of contact with the lower jaw, a separate type face molding matrix adapted to be removably arranged on the base, a separate holder adapted to be removably applied to the base for being operated to adjustably move said matrix toward and from the lower jaw, a side molding matrix adapted to be removably arranged in the recess of the base in spaced relation to the side jaw, a separate feeder having spaced inlets of different sizes, adapted to be detachably fastened to the base so that one of its inlets will be in communication with the space between all of the jaws and said matrixes for receiving molten metal for being molded into type and the like as well as forming a tail thereon, an ejector carrying the side matrix, slidably movable for causing molded type to be delivered on the guide of the lower jaw, a hammer on the side jaw for breaking off the tail of type with the lowering of the bracket and following the ejected movement of the type, a cutter on the guide for grooving one of the side faces of each type with its ejection following being molded, a second cutter on the base for grooving the tail end of each type subsequent to the severance of its tail, and mechanism adapted to be operated for raising and lowering the bracket, then operating the holder and subsequently operating said ejector.

41. In a machine for casting type and the like, in combination, a lower jaw, an upper jaw, a side jaw, and a side jaw matrix, all relatively adjustable for providing variable mold spaces substantially rectangular in cross-section between the jaws and the upper jaw with one of the side jaws adapted to be swung toward and from the other jaws.

42. In a machine for casting type and the like, in combination, a lower jaw, an upper jaw, a side jaw, and a side jaw matrix, all relatively adjustable for providing variable mold spaces substantially rectangular in cross-section between the jaws and the upper jaw with one of the side jaws adapted to be swung toward and from the other jaws, said side jaw matrix, adapted to be moved crosswise of the upper face of the lower jaw subsequent to the swinging of the upper jaw with the first named side jaw from the lower jaw and from the side jaw matrix.

43. In a machine for casting type and the like, in combination, a lower jaw, an upper jaw, a side jaw, and a side jaw matrix, all relatively adjustable for providing variable mold spaces substantially rectangular in cross-section between the jaws, and the upper jaw with one of the side jaws adapted to be swung toward and from the other jaws, and a feeder having spaced inlets held whereby one of its inlets is in register with the mold space for delivering molten metal to the mold space.

44. In a machine for casting type and the like, in combination, a lower jaw, an upper jaw, a side jaw, and a side jaw matrix, all relatively adjustable for providing variable mold spaces substantially rectangular in cross-section between the jaws, and the upper jaw with one of the side jaws adapted to be swung toward and from the other jaw, said side jaw matrix adapted to be moved crosswise of the upper face of the lower jaw subsequent to the swinging of the upper jaw with the first named side jaw from the lower jaw and from the side jaw matrix, and a feeder having spaced inlets held whereby one of its inlets is in register with the mold space for delivering molten metal to the mold space.

45. In a machine for casting type and the like, in combination, a longitudinally and vertically adjustable lower jaw, a vertically adjustable upper jaw, a vertically adjustable side jaw, and a side jaw matrix longitudinally adjustable relative to the vertically adjustable side jaw for providing a mold space substantially rectanguler in cross section between the jaws, and a feeder having spaced inlets held whereby one of its inlets is in register with the mold space for delivering molten metal to the mold space.

46. In a machine for casting type and the like, in combination, a longitudinally and vertically adjustable lower jaw, a detachably connected upper jaw and a side jaw, both jointly adjustable vertically and each separately adjustable vertically relative to the lower jaw, a side jaw matrix longitudinally adjustable relative to the vertically adjustable side jaw and vertically adjustable relative to the lower jaw as well as relative to the upper jaw, and a character matrix for providing a mold space substantially rectangular in cross section between the jaws and said character matrix, and a feeder having spaced inlets held whereby one of its inlets is in register with the mold space for delivering molten metal to the mold space.

This specification signed and witnessed this 7th day of November, A. D. 1921.

AUGUST L. N. FLEMING.

Witnesses:
J. A. LEICHTER,
J. FREDERICK CRYER.